Sept. 28, 1954     F. F. WINBERG ET AL     2,690,500
ELECTRICALLY HEATED VAPORIZER WITH FUSE
Filed April 23, 1952                            2 Sheets-Sheet 2
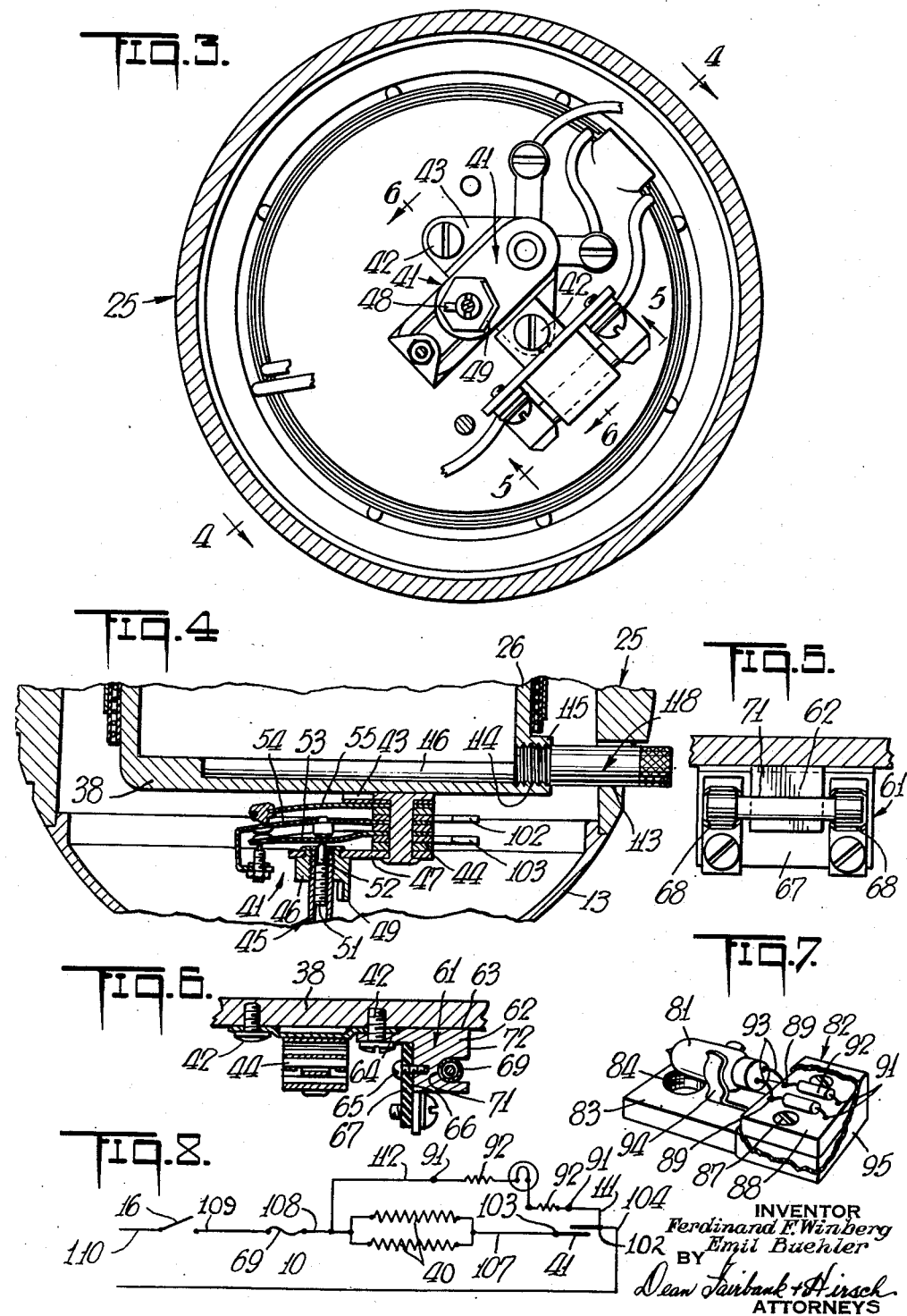
INVENTOR
Ferdinand F. Winberg
Emil Buehler
BY
Dean Fairbank & Hirsch
ATTORNEYS Patented Sept. 28, 1954

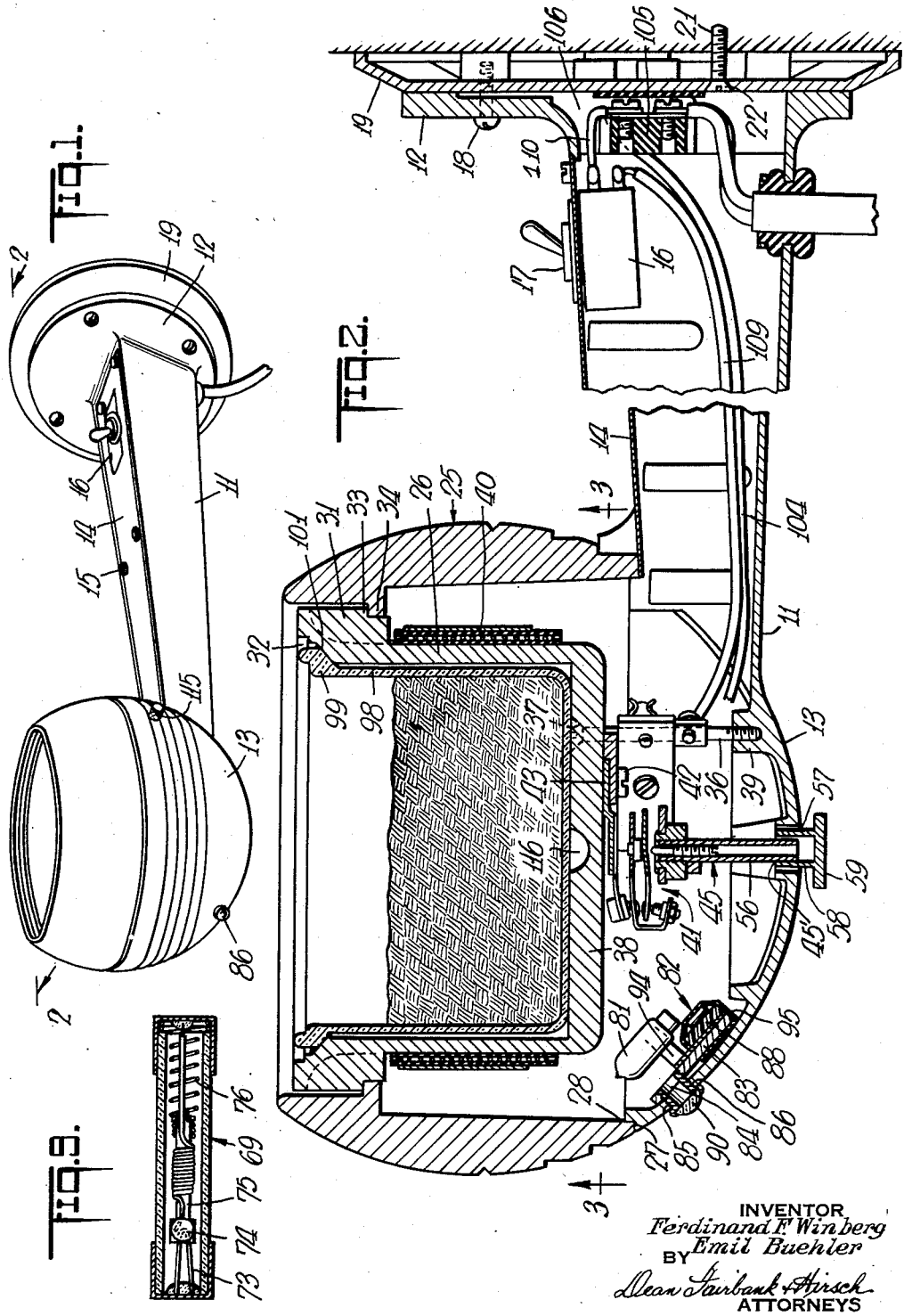

2,690,500

UNITED STATES PATENT OFFICE 2,690,500

ELECTRICALLY HEATED VAPORIZER WITH FUSE

Ferdinand F. Winberg, Elmhurst, N. Y., and Emil Buehler, North Haledon, N. J., assignors to American Aerovap, Inc., New York, N. Y., a corporation of New York Application April 23, 1952, Serial No. 283,936

3 Claims. (Cl. 219—44)

This invention relates to the art of heating devices and more particularly to a device for dispensing insecticides and fumigants in the form of a vapor.

As conducive to an understanding of the invention, it is noted that in order for an insecticide that is dispensed by heating to form a vapor, to give effective control of insects such as fleas and mosquitoes, the rate of vaporization must be within a predetermined range, depending upon the size of the room in which it is dispensed. As the insecticide is generally a poison, if the rate of vaporization is above a given amount for a room of a given size, a health hazard to humans may occur as the vapor may cause injury to the eyes, the mucous membranes in the nose and to the throat.

Where the electric heating element of the device is controlled by a thermostat to maintain a predetermined temperature in order that the rate of vaporization may be set at a desired safe amount, if the thermostat should fail and remain in circuit closed position and the temperature should increase above the maximum amount for a safe rate of vaporization, the human health hazard above pointed out may occur.

It is accordingly among the objects of the invention to provide a heating device for dispensing insecticides by vaporization that is rugged, compact and of neat appearance and may readily be mounted on a wall or post with a minimum of effort, that is easy to charge and the operating temperature of which may readily be adjusted to set the rate of vaporization of the insecticide without disassembly of the device, that has but few parts that are not likely to become deranged and that lends itself to mass production and may quickly be disassembled for inspection and repair and which, in the event of failure of the control thermostat therein, will dependably cut off to prevent an excessive rate of vaporization.

According to the invention, a cup-shaped receptacle of heat conducting material, girdled by a plurality of heating elements electrically insulated therefrom but in effective heat conducting relation thereto is mounted in a suitable holder, and has a thermostat mounted thereon, with a control shaft extending through the bottom of said holder to permit adjustment of the operating temperature of the device from the exterior thereof. A thermally actuated fuse controlling the circuit to said heating elements, is also mounted on the receptacle and is in heat conducting relation thereto. A metal cup is preferably removably disposed in said receptacle and is snugly fitted therein to be heated thereby, said cup containing a solid insecticide that is not volatile at room temperature.

In the accompanying drawings in which are shown one or more of various possible embodiments of the several features of the invention, Fig. 1 is a perspective view of the device, Fig. 2 is a longitudinal sectional view on a larger scale and with parts broken away, taken along line 2—2 of Fig. 1, Fig. 3 is a transverse sectional view taken along line 3—3 of Fig. 2, Fig. 4 is a sectional view taken along line 4—4 of Fig. 3, Fig. 5 is a view taken along line 5—5 of Fig. 3, Fig. 6 is a view taken along line 6—6 of Fig. 3, Fig. 7 is a perspective view on an enlarged scale, of the lamp holder, Fig. 8 is a circuit diagram of the device, and Fig. 9 is a longitudinal view of the fuse partly in cross section.

Referring now to the drawings, the device desirably comprises a hollow bracket arm 11, preferably of cast iron or aluminum which is trough shaped in cross section and may taper from the mounting plate 12 at one end thereof integral therewith to the inverted dome 13 at the other end thereof, also integral therewith, the mouth of said dome lying in a plane at right angles to that of said mounting plate.

A cover plate 14 which provides access to the interior of the hollow bracket arm 11 is removably affixed to the open top thereof by means of screws 15 and mounts on on-off switch 16 rigidly affixed thereto by lock nut 17 adjacent the mounting plate 12. Mounting plate 12, which is preferably circular, is desirably affixed by screws 18 to a wall plate 19 which may be mounted on a wall or post by screws 21 extending into countersunk openings 22 in wall plate 19.

The inverted dome 13 of bracket arm 11 together with a hollow casing 25, preferably of insulating material mounted thereon, form a holder for a substantially cylindrical cup-shaped heating receptacle 26 of heat conducting material such as aluminum. Although the casing 25 may be mounted on the inverted dome 13 in any suitable manner, the lower edge thereof is desirably seated on an external annular shoulder 27 near the upper rim 28 thereof.

As shown in Fig. 2, the receptacle 26 desirably has a plurality of vertical bosses 31 on its outer face, spaced along the periphery of said receptacle near the mouth 32 thereof, each of said bosses having a bottom shoulder 33 which rests on an inwardly extending flange 34 near the mouth of casing 25.

Means are provided securely to retain the receptacle 26 and the casing 25 upon the inverted dome 13. Although any suitable means could be used for this purpose, in the embodiment herein shown, such means desirably comprises a plurality of screws 36 which extend through openings 37 in the floor 38 of the receptacle 26 and are screwed respectively into threaded openings in a plurality of bosses 39 on the floor of the inverted dome 13 and preferably cast integral therewith.

The receptacle 26 has a plurality of heating elements 40 mounted thereon which preferably are of the type shown in Patent No. 2,540,095, dated February 6, 1951. The heating elements 40 which are insulated in conventional manner, girdle the side wall of the heating receptacle 26 and are affixed thereto in any suitable manner.

The construction thus far described is not per se claimed as it is shown and described in copending application Serial No. 217,858, filed March 27, 1951.

According to the invention a snap action thermostat 41 which may be of conventional type is affixed to the undersurface of the floor 38 of the receptacle 26. The thermostat is preferably mounted by means of screws 42 which extend through lateral wings 43, rigid with the insulating stack 44 which carry the operating parts of the thermostat, into threaded openings in the floor 38 of the heating receptacle 26. The thermostat 41 desirably has a hollow control shaft 45 depending therefrom, which extends through an axial opening 45' in dome 13, to provide ready access to said shaft for thermostat adjustment.

As shown in Figs. 3 and 4, the shaft 45 is desirably screwed into a nut 46 affixed to a support arm 47 mounted on stack 44. The shaft 45 desirably has a laterally extending pin 48 affixed thereto which abuts against a depending projection 49 on nut 46 to limit the rotation of said shaft. The upper end of the shaft 45 is internally threaded to receive the correspondingly threaded end of a screw 51, the latter having an insulated stud 52 at the end thereof which normally engages one of the arms 53 of the thermostat 41. Thus, depending upon the direction of rotation of the shaft 45 or the screw 51, the arms 53 and 54 of the thermostat 41 will be moved toward or away from bimetal arm 55 to vary the temperature at which thermostat 41 will operate.

With the two adjustments of the thermostat 41 above described, the range of operation of the latter may be spread over any portion of a wide range, say from 0 to 200 degrees C. in steps of say 50 degrees. Thus, a complete rotation of control shaft 45 will permit adjustment of the temperature of operation of the thermostat within a range of 50 degrees C. and the adjustment of screw 51 will determine the portion of the entire range of 0 to 200 degrees C. that the range of 50 degrees will occupy.

Although the control shaft 45 may be rotated in any suitable manner, in the illustrative embodiment herein shown, the shaft is desirably fluted along its length as at 56 and the opening 45' is countersunk as at 57 on the outer surface of the dome 13 to provide clearance about said shaft so that the end thereof may be securely yet detachably engaged by the internally fluted wall of the cylindrical extension 58 of an adjusting tool 59 for rotation of said control shaft.

Also affixed to the undersurface of the floor 38 of the receptacle 26 is a fuse holder 61 which desirably comprises a substantially rectangular metal block 62 of heat conducting material. The block 62 desirably has one surface 63 thereof flush against the undersurface of floor 38 and is securely retained in place as by means of one of the screws 42 which extends through a lateral extending arm 64 desirably formed rigid with block 62.

Affixed as by screw 65 to the vertical surface 66 of block 62 adjacent arm 64 is an insulating strip 67 which desirably has a fuse clip 68 mounted at each end thereof, the clips removably retaining a fuse 69 in place so that it fits snugly in a groove 71 in the surface 72 of block 62 opposed to arm 64, the glass casing of said fuse 69 desirably being in contact with the wall of the groove 71.

The fuse which is shown in Fig. 9, is desirably of the dual element type that will respond to both excess current flow and excess temperature and may be, for example, of the type known commercially as a Fusetron MDL–2 put out by Bussman Mfg. Company. This fuse has a current responsive wire 73 retained by a heat responsive metal solder 74 on an arm 75 retained under tension by a coil spring 76. Thus upon excess current flow, the wire 73 will melt to break the circuit and upon excessive temperature, the bonding action of the solder 74 which holds the wire 73 to the arm 75 will not be sufficient to retain the elements together against the tension of coil spring 76 so that the wire and arm will separate to break the circuit.

In order to indicate when the thermostat 41 is operating, a suitable indicating lamp 81 is provided, mounted on a holder 82. As shown in Figs. 2 and 7, the holder 82 desirably comprises a substantially rectangular strip 83 preferably of metal which desirably has a threaded opening 84 near one end thereof. The strip is rigidly affixed in the dome 13 to the wall thereof by means of a hollow screw 85 which extends into a suitable hole 86 in said wall and is threaded into opening 84, the head of said screw 85 on the outer surface of said wall desirably having a transparent colored glass 90 therein.

Affixed to strip 83, as by screws 87, is a substantially rectangular block 88 of insulating material which occupies only a portion of said strip. The block 88 desirably has two pairs of terminals 89 and 91 thereon between each of which is desirably mounted a voltage dropping resistance 92. The terminals 89 are desirably connected by leads 93 to the filament of the lamp 81 which is supported over the opening 84 by a clip 94 affixed to strip 83 so that when the lamp is illuminated, the glass 90 will also be lit. In order to eliminate any possibility of short circuit, a plastic sleeve 95 is positioned so as to encompass the insulating block 88 and the portion of the metal strip 83 associated therewith.

Removably positioned in heating receptacle 26 is a cup 98 which may be of anodized aluminum, "Pyrex" or the like, of diameter slightly less than the inner diameter of said receptacle and having an outwardly flared rim 99 which rests on the beveled rim 101 of the receptacle to be supported thereby. The dimensions of the cup are so chosen with respect to the dimensions of the heating receptacle that the wall and bottom of the cup will lie in close juxtaposition to the corresponding parts of the receptacle for facility of heat transfer therefrom to the cup.

In order electrically to connect thermostat 41, the fuse 69, heating elements 40, lamp 81 and switch 16 to a source of power, the thermostat 41 desirably has a pair of terminals 102 and 103, the former of which is connected by lead 104 to a screw (not shown) on a terminal block 105, desirably positioned in a recess 106 in mounting plate 12 adjacent arm 11.

The heating elements 40 which illustratively are in parallel, are connected by lead 107 to terminal 103 of thermostat 41 and by lead 108 to one of the clips 68 of fuse holder 61, the other clip 68 of said holder being connected by lead 109 to one side of switch 16, the other side of which is connected by lead 110 to a screw on terminal block 105. The terminals 91 of lamp holder block 82 are connected respectively by leads 111 and 112 to terminal 102 of thermostat 41 and to lead 108. In order to complete the circuit, a source of power is connected to the screws on the terminal block 105.

With the circuit thus described, the parallel connected heating elements 40 and the thermostat 41 are in series with the source of power so that when said thermostat 41, which is of the normally closed type, is open, no current will flow to the heating elements and hence the latter will cool.

In order to determine if the device is operating properly, a thermometer (not shown) may be inserted through an opening 113 in casing 25 into a lateral opening 114 in an embossment 115 on the heating receptacle 26 which had a radial groove 116 in the top surface of the floor 38 thereof aligned with openings 113 and 114. Inasmuch as the thermometer will lie between the floor 38 of the heating receptacle and the undersurface of cup 98, which may rest on said floor 38, the thermometer will accurately indicate the temperature of the contents of the cup. Desirably, a removable plug 118 inserted through opening 113 in casing 25 and screwed into the opening 114, in embossment 115, seals said openings when the latter are not in use, thereby to prevent the accumulation of dirt or dust in the holder.

In the operation of the device, when switch 16 is closed, a circuit will be completed through the fuse 69, the heating elements 40, and the normally closed thermostat 41. As a result, the receptacle 26 and the cup 98 will be heated, causing volatilization of the contents of the latter which illustratively contains a solid insecticide such as "Lindane" which is not volatile at room temperature. The thermostat 41 is set to open the circuit to the heating elements 40 when the temperature rises to a predetermined value so that the consequent reduction in temperature will cause the thermostat to cool and again close for more intense heating after the temperature has fallen to a predetermined value, the illumination of lamp 81 indicating when the thermostat has opened. Thus, overheating of the contents of the cup 98 with resultant excessive vaporization thereof is avoided, yet the temperature is at all times sufficiently elevated for volatilization at the desired rate.

In the event of excessive current flow, such as might occur in the event of a short circuit, the melting of the fuse wire 73 would break the circuit to prevent injury to components of the device.

In a typical unit in which the insecticide being evaporated is "Lindane," and a temperature of say 119° C. at the floor of the receptacle 26 as indicated by the thermometer in groove 116, gives off one gram per 24 hours, safe and satisfactory control of flies, mosquitoes and the like will be afforded in a room having a volume of 15,000 cubic feet.

In the event that the thermostat 41 should fail to operate, as the continuous operation of the heating elements 40 would not increase the current flowing through the circuit, and hence the fuse wire 73 would not melt, the temperature imparted to receptacle 26 would gradually rise.

If the temperature should rise to say 150° C., the rate of vaporization would increase to an amount above that safe for human tolerance, with resultant irritation of the mucous membranes, eyes and nasal passageways.

This danger however is avoided by reason of the fuse 69 which is set to be actuated by excessive temperatures, for the heat responsive metal 74 will become plastic and not bond to the arm 75. As a result, the spring 76 will pull the arm 75 away from wire 73 to break the circuit.

With the construction herein described, a neat, compact yet highly efficient heating device is provided which very dependably retains the temperature of the contents of the cup within a predetermined range and the operating temperature of which may readily be adjusted from the exterior of the device by merely inserting the adjustment tool 59 into the countersunk opening in the dome 13 to rotate the control shaft 48 and with assurance that no excessive rate of vaporization may occur in the event of breakdown of the thermostat.

As many changes could be made in the above construction, and many apparently widely different embodiments of this invention could be made without departing from the scope of the claims, it is intended that all matter contained in the above description or shown in the accompanying drawings shall be interpreted as illustrative and not in a limiting sense.

Having thus described our invention, what we claim as new and desire to secure by Letters Patent of the United States is:

1. Equipment of the character described comprising a holder, a receptacle affixed in said holder, electric heating means for said receptacle, a heat conductive member affixed to the undersurface of said heating receptacle, a heat responsive fuse in said holder positioned in juxtaposition to said heat conductive member, said fuse comprising an insulated casing with a terminal at each end thereof and said heat conductive member comprising a metal block of length less than the length of the fuse, said block having a longitudinal notch therein in which the fuse may be positioned with the casing of said fuse in engagement with the surface of said notch, the terminal ends of said fuse extending beyond the ends of the notch, means electrically insulated from the block and the receptacle removably to mount said fuse ends, and thermostatic means in said holder affixed to the undersurface of said receptacle adjacent said heat conductive member, said thermostatic means controlling said heating means for regulation of the temperature of said receptacle, said fuse being connected in series with said heating means to break the circuit thereto upon opening of said fuse when the temperature of said receptacle rises above a predetermined amount.

2. The combination set forth in claim 1 in which the means to mount said fuse ends comprises an insulating strip affixed to said block and extending longitudinally thereof, the ends of said strip extending beyond the ends of said block, and a mounting clip on each of said extending ends, said clips straddling the block and being longitudinally aligned with said notch.

3. Equipment of the character described comprising a holder having an opening, a receptacle affixed in said holder, electric heating means for said receptacle, a heat conductive member affixed to the undersurface of said heating receptable, a heat responsive fuse in said holder positioned in juxtaposition to said heat conductive member, thermostatic means in said holder affixed to the undersurface of said receptacle adjacent said heat conductive member, said thermostatic means controlling said heating means for regulation of the temperature of said receptacle, said fuse being connected in series with said heating means to break the circuit thereto upon opening of said fuse when the temperature of said receptacle rises above a predetermined amount, a rectangular strip having a threaded opening near one end, a hollow screw extending through the opening in said holder and threaded into the opening in said strip rigidly to clamp the latter against the inner surface of said holder, said strip having an inwardly extending raised portion of insulating material along the portion of its length spaced from the opening therein, a lamp having a pair of terminals, a lamp mounting clip on the strip between the opening therein and the raised portion to support said lamp over said opening, a high resistance in series with each of the terminals of said lamp, said lamp and said series connected resistances being connected in parallel with said heating means and said thermostatic means, means on said raised portion over said strip to mount said resistors and an insulated sleeve encompassing said strip and the associated raised portion thereon, said resistors and the mount therefor being positioned in said sleeve.

References Cited in the file of this patent

UNITED STATES PATENTS

| Number | Name | Date |
|---|---|---|
| 2,225,287 | Sundt | Dec. 17, 1940 |
| 2,522,718 | Huck | Sept. 19, 1950 |
| 2,541,637 | Christopher et al. | Feb. 13, 1951 |
| 2,602,248 | Finlayson | July 8, 1952 |